(12) United States Patent
Mujtaba et al.

(10) Patent No.: US 9,084,128 B2
(45) Date of Patent: Jul. 14, 2015

(54) LTE/1X DUAL-STANDBY WITH SINGLE-CHIP RADIO

(71) Applicant: Apple Inc., Cupertino, CA (US)

(72) Inventors: Syed Aon Mujtaba, Santa Clara, CA (US); Wen Zhao, San Jose, CA (US); Xiaowen Wang, Cupertino, CA (US); Vinay Majjigi, Sunnyvale, CA (US); Isabel G. Mahe, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/082,093

(22) Filed: Nov. 15, 2013

(65) Prior Publication Data

US 2014/0073371 A1 Mar. 13, 2014

Related U.S. Application Data

(62) Division of application No. 13/195,732, filed on Aug. 1, 2011.

(60) Provisional application No. 61/476,736, filed on Apr. 18, 2011.

(51) Int. Cl.
*H04B 1/04* (2006.01)
*H04W 24/00* (2009.01)
(Continued)

(52) U.S. Cl.
CPC .............. *H04W 24/00* (2013.01); *H04W 68/00* (2013.01); *H04W 88/06* (2013.01); *H04B 7/0602* (2013.01); *H04B 7/0802* (2013.01); *H04W 88/10* (2013.01)

(58) Field of Classification Search
USPC ............. 455/127.4, 426.1, 432.1, 434, 435.1, 455/435.2, 436, 525, 552.1, 553.1, 160.1; 370/331–334
See application file for complete search history.

(56) References Cited

U.S. PATENT DOCUMENTS

| 6,454,522 B2 | 9/2002 | Sakamoto et al. |
| 6,768,896 B2 | 7/2004 | Tjalldin et al. |

(Continued)

FOREIGN PATENT DOCUMENTS

| EP | 2063548 | 5/2009 |
| JP | 2000196520 | 7/2000 |

(Continued)

OTHER PUBLICATIONS

EPO Extended European Search Report (EESR) for EP Application No. 12164404.1, Oct. 9, 2013.

(Continued)

*Primary Examiner* — Dominic E Rego
(74) *Attorney, Agent, or Firm* — Meyertons, Hood, Kivlin, Kowert & Goetzel, P.C.

(57) ABSTRACT

Electronic devices may be provided that contain wireless communication circuitry. The wireless communication circuitry may include radio-frequency transceiver circuitry coupled to antennas by switching circuitry. Multiple radio access technologies may be supported. A device may include first and second antennas. Control circuitry can configure the transceiver circuitry and switching circuitry to support operation of the device in active and idle modes for each radio access technology. In some configurations, both antennas may be used to support operations associated with one of the radio access technologies. In other configurations, the first antenna may be used to support operations with a first of the radio access technologies while the second antenna is used to support operations with a second of the radio access technologies.

17 Claims, 12 Drawing Sheets

(51) Int. Cl.
*H04W 68/00* (2009.01)
*H04W 88/06* (2009.01)
*H04B 7/06* (2006.01)
*H04B 7/08* (2006.01)
*H04W 88/10* (2009.01)

(56) References Cited

U.S. PATENT DOCUMENTS

| | | | |
|---|---|---|---|
| 7,020,122 | B1 | 3/2006 | Hirai et al. |
| 2005/0245207 | A1 | 11/2005 | Suzuki et al. |
| 2007/0242784 | A1 | 10/2007 | Sampson et al. |
| 2009/0063911 | A1 | 3/2009 | Tsukio et al. |
| 2009/0137214 | A1 | 5/2009 | Hofmann et al. |
| 2010/0086070 | A1 | 4/2010 | Ishii et al. |
| 2010/0142440 | A1 | 6/2010 | Inoue |
| 2010/0142487 | A1 | 6/2010 | Kim |
| 2010/0210226 | A1 | 8/2010 | Matsuyama |
| 2010/0261487 | A1 | 10/2010 | Razdan |
| 2010/0317374 | A1 | 12/2010 | Alpert et al. |
| 2011/0080894 | A1 | 4/2011 | Iwamura et al. |
| 2011/0122784 | A1* | 5/2011 | Ananthanarayanan et al. ............... 370/252 |
| 2011/0143807 | A1 | 6/2011 | Aue et al. |
| 2011/0199915 | A1* | 8/2011 | Santhanam et al. ......... 370/252 |
| 2012/0064954 | A1 | 3/2012 | Kato |

FOREIGN PATENT DOCUMENTS

| | | |
|---|---|---|
| JP | 2006311258 | 11/2003 |
| JP | 2008085793 | 4/2008 |
| JP | 2009267996 | 11/2009 |
| JP | 2010098612 | 4/2010 |
| JP | 2010278640 | 12/2010 |
| WO | 2008126604 | 10/2008 |
| WO | 2010135517 | 11/2010 |
| WO | 2011056253 | 5/2011 |

OTHER PUBLICATIONS

PCT International Search Report (ISR) for PCT Application No. PCT/US2012/033049, Jul. 20, 2012.
JPO Office Action for JP Application No. 2012-093363, Jun. 24, 2013.
Notice of Allowance from Japanese Application No. 2013207550, issued Mar. 6, 2015, Japanese version, pp. 1-3.
Office Action from Mexican Application No. MX/a/2014/011808, issued Feb. 17, 2015, English and Spanish versions, pp. 1-2. The Mexican Office Action objects to the independent claims of the Mexican Application as allegedly not novel in view of D1 (WO 2010135517), citing paragraphs 0038-0042, 0054-0057, and 0063 of the D1 reference.

* cited by examiner

|  | LTE IDLE | LTE ACTIVE |
|---|---|---|
| 1X IDLE (ONE ANT.) | SATISFACTORY | SATISFACTORY (DEGRADED LTE) |
| 1X IDLE (TWO ANTS.) | SATISFACTORY (DEGRADED) | INTERRUPTED LTE |
| 1X ACTIVE (ONE ANT.) | SATISFACTORY | UNSATISFACTORY |
| 1X ACTIVE (TWO ANTS.) | LTE IS INTERRUPTED | LTE IS INTERRUPTED |

FIG. 6

LTE/1X DUAL-STANDBY WITH SINGLE-CHIP RADIO

PRIORITY CLAIM

This application is a divisional of and claims the benefit of priority from U.S. patent application Ser. No. 13/195,732, entitled "LTE/1x Dual-Standby with Single-Chip Radio" and filed on Aug. 1, 2011, which claims the benefit of priority from U.S. Provisional Patent Application Ser. No. 61/476,736, entitled "LTE/1x Dual-Standby with Single-Chip Radio" and filed on Apr. 18, 2011, both of which are fully incorporated herein by reference for all purposes and to the extent not inconsistent with this application.

BACKGROUND

This relates generally to wireless communication circuitry, and more particularly, to electronic devices that have wireless communication circuitry that supports multiple radio access technologies.

Electronic devices such as portable computers and cellular telephones are often provided with wireless communication capabilities. For example, electronic devices may use long-range wireless communication circuitry such as cellular telephone circuitry and WiMAX (IEEE 802.16) circuitry. Electronic devices may also use short-range wireless communication circuitry such as WiFi® (IEEE 802.11) circuitry and Bluetooth® circuitry.

In some devices, it may be desirable to support multiple radio access technologies. For example, it may be desirable to support newer radio-access technologies for handling data sessions and older radio-access technologies for supporting voice calls. Examples of different radio-access technologies that have been used in cellular telephones include Global System for Mobile Communications (GSM), Universal Mobile Telecommunications System (UMTS), Code Division Multiple Access (CDMA) (e.g., CDMA2000 including standards such as CDMA2000 1XRTT), and Long Term Evolution (LTE).

In theory, an electronic device may support any number of desired radio access technologies by incorporating sufficient hardware resources into the device. For example, a device may operate an independent wireless circuit and a dedicated antenna for each radio access technology. In practice, however, such a scheme may be impractical. Besides the inefficiency of including a different radio chipset and antenna for each supported radio-access technology, this approach may not guarantee immunity from interference among the various radio access technologies.

It would therefore be desirable to be able to provide improved ways in which to support multiple radio access technologies in an electronic device.

SUMMARY

Electronic devices may be provided that contain wireless communication circuitry. The wireless communication circuitry may include radio-frequency transceiver circuitry coupled to antennas using switching circuitry. Control circuitry may be used to adjust the configuration of the radio-frequency transceiver circuitry and the switching circuitry.

The wireless communication circuitry may support operations using multiple radio access technologies. The antennas may include first and second antennas. The control circuitry can provide the transceiver circuitry and switching circuitry with dynamic control signals that configure the electronic device to support various combinations of active and idle mode operation. For example, the transceiver circuitry and switching circuitry may be configured to allow both the first and second antennas to be simultaneously used to support operations for a particular radio access technology or may be configured to allow the first antenna to be used in supporting a first radio access technology while the second antenna is used in supporting the second radio access technology.

Further features of the invention, its nature and various advantages will be more apparent from the accompanying drawings and the following detailed description of the preferred embodiments.

BRIEF DESCRIPTION OF THE DRAWINGS

FIG. 6 is a table showing illustrative possible modes of operation for an electronic device with multiple antennas that supports operations with multiple radio access technologies in accordance with an embodiment of the present invention.

DETAILED DESCRIPTION

Figure 1:
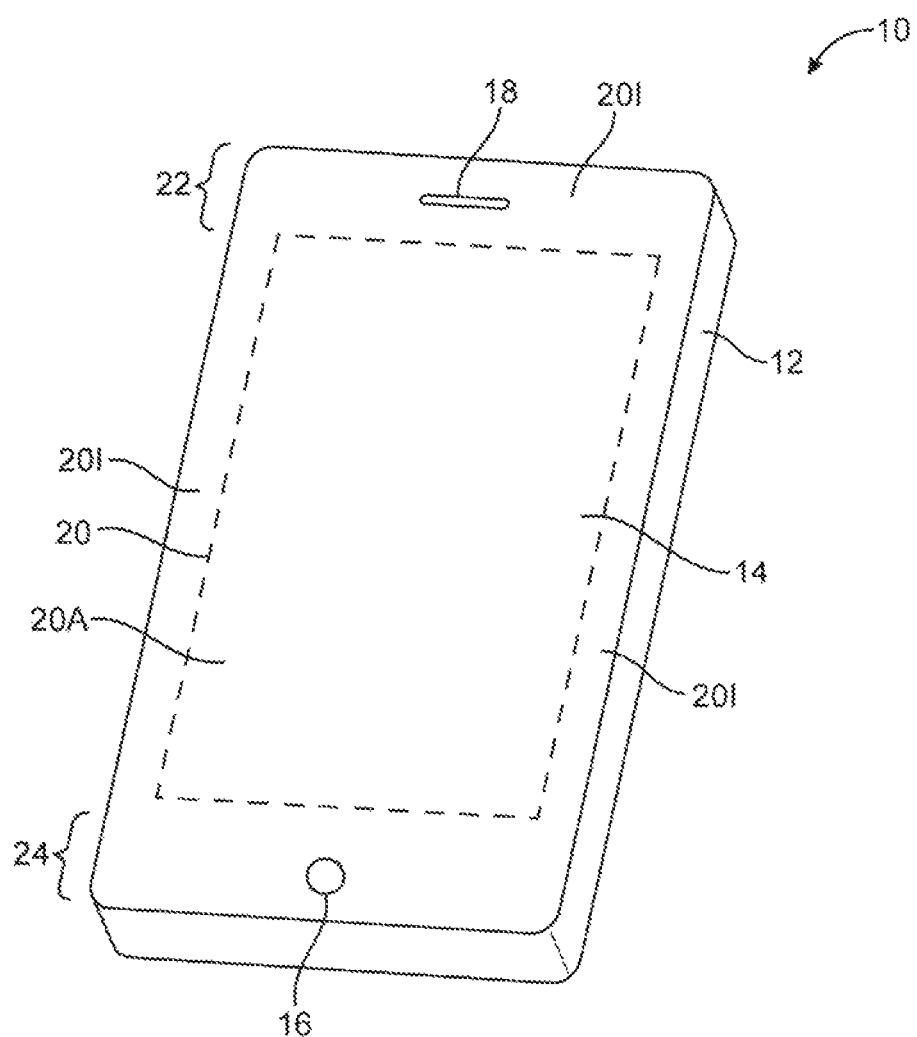
FIG. 1 is a perspective view of an illustrative electronic device with wireless communication circuitry in accordance with an embodiment of the present invention.

Electronic devices may be provided with wireless communication circuitry. The wireless communication circuitry may be used to support multiple radio access technologies (communications protocols). For example, an electronic device may support communications with a Global System for Mobile Communications (GSM) radio access technology, a Universal Mobile Telecommunications System (UMTS) radio access technology, a Code Division Multiple Access (CDMA) radio access technology (e.g., CDMA2000 1XRTT or other CDMA radio access technologies), a Long Term Evolution (LTE) radio access technology, and/or other radio access technologies.

In some embodiments, an electronic device may be described that supports at least two radio access technologies such as LTE and CDMA2000 1XRTT (sometimes referred to herein as "1X"). Other radio access technologies may be supported if desired. The use of a device that supports two radio access technologies such as LTE and 1X radio access technologies is merely illustrative.

The two (or more) radio access technologies for the electronic device may be supported using shared wireless 30 communication circuitry such as shared radio-frequency transceiver circuitry and a common baseband processor 6 integrated circuit (sometimes referred to as a "radio").

The electronic device may have multiple antennas. For example, the electronic device may have a pair of cellular telephone antennas. The antennas may be coupled to the shared wireless communication circuitry using switching circuits and other radio-frequency front-end circuitry in the wireless circuitry of the electronic device. The wireless circuitry can be configured in real time depending on the desired mode of operation for the device.

When configured to support normal LTE operations, each of the antennas in the device may be used in receiving a corresponding LTE data stream. The simultaneous use of two antennas to receive two LTE data streams (a type of arrangement that is sometimes referred to as receiver diversity or receive diversity) helps to improve received data rates. Accordingly, the use of receive diversity is specified by the LTE protocol.

To avoid missing incoming 1X calls, a 1X paging channel may be monitored once per 1X paging cycle. To ensure that disruption to an active LTE data session is minimized, 1X page monitoring operations can be performed by temporarily using one of the antennas for 1X page monitoring while the other of the antennas continues to be used for receiving LTE data. In some situations, received signal strength in the 1X paging channel is low. In these situations, both of the antennas can be temporarily used in receiving 1X paging channel signals. After the 1X paging channel has been monitored for a desired time period (sometimes referred to as a 1X wake period), the antennas 30 can again both be used for LTE data.

This antenna allocation scheme may be performed 7 continuously during operation of the electronic device. Both antennas may be used for LTE traffic during periods of time in which the 1X paging channel does not need to be monitored. When the time arrives for monitoring the 1X paging channel, one or both of the antennas being used to handle LTE traffic can be temporarily used for monitoring the 1X paging channel.

An illustrative electronic device of the type that may be used to support multiple radio access technologies is shown in FIG. 1. Electronic device 10 may be a portable electronic device or other suitable electronic device. For example, electronic device 10 may be a laptop computer, a tablet computer, a somewhat smaller device such as a wristwatch device, pendant device, headphone device, earpiece device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 30 may include image pixels formed from light-emitting diodes (LEDs), organic LEDs (OLEDs), plasma cells, electronic ink 8 elements, liquid crystal display (LCD) components, or other suitable image pixel structures. A cover glass layer may cover the surface of display 14. Portions of display 14 such as peripheral regions 20I may be inactive and may be devoid of image pixel structures. Portions of display 14 such as rectangular central portion 20A (bounded by dashed line 20) may correspond to the active part of display 14. In active display region 20A, an array of image pixels may be used to display images for a user.

The cover glass layer that covers display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Housing 12 may include a peripheral conductive member such as a bezel or band of metal that runs around the rectangular outline of display 14 and device 10 (as an example). The peripheral conductive member may be used in forming the antennas of device 10 if desired.

Antennas may be located along the edges of device 10, on the rear or front of device 10, as extending elements or attachable structures, or elsewhere in device 10. With one suitable arrangement, which is sometimes described herein as an example, device 10 may be provided with one or more antennas at lower end 24 of housing 12 and one or more antennas at upper end 22 of housing 12. Locating antennas 30 at opposing ends of device 10 (i.e., at the narrower end regions of display 14 and device 10 when device 10 has an 9 elongated rectangular shape of the type shown in FIG. 1) may allow these antennas to be formed at an appropriate distance from ground structures that are associated with the conductive portions of display 14 (e.g., the pixel array and driver circuits in active region 20A of display 14).

If desired, a first cellular telephone antenna may be located in region 24 and a second cellular telephone antenna may be located in region 22. Antenna structures for handling satellite navigation signals such as Global Positioning System signals or wireless local area network signals such as IEEE 802.11 (WiFi®) signals or Bluetooth® signals may also be provided in regions 22 and/or 24 (either as separate additional antennas or as parts of the first and second cellular telephone antennas).

Antenna structures may also be provided in regions 22 and/or 24 to handle WiMAX (IEEE 802.16) signals.

In regions 22 and 24, openings may be formed between conductive housing structures and printed circuit boards and other conductive electrical components that make up device 10. These openings may be filled with air, plastic, or other dielectrics. Conductive housing structures and other conductive structures may serve as a ground plane for the antennas in device 10. The openings in regions 22 and 24 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element such as 30 an inverted-F antenna resonating element formed from part of a conductive peripheral housing structure in device 10 from 10 the ground plane, or may otherwise serve as part of antenna structures formed in regions 22 and 24.

Antennas may be formed in regions 22 and 24 that are identical (i.e., antennas may be formed in regions 22 and 24 that each cover the same set of cellular telephone bands or other communications bands of interest). Due to layout constraints or other design constraints, it may not be desirable to use identical antennas. Rather, it may be desirable to implement the antennas in regions 22 and 24 using different designs (e.g., using different antenna types and/or designs that exhibit different gains). For example, the first antenna in region 24 may cover one set of cellular telephone bands of interest and the second antenna in region 22 may cover a different set of cellular telephone bands of interest (as an example). Tuning circuitry may be used to tune an antenna in real time to cover either a first subset of bands, or a second subset of bands, and thereby cover all bands of interest.

If desired, an antenna selection control algorithm that runs on the circuitry of device 10 can be used to automatically select which antenna(s) are used in device 10 in real time. The antennas may, for example, contain a primary antenna (e.g., an antenna in region 24 that exhibits a first gain) and a secondary antenna (e.g., an antenna in region 24 that exhibits a second gain that is less than the first gain). The antenna selection control algorithm may configure circuitry in device 10 so that the primary antenna is connected to a first port associated with a baseband processor and so that the secondary antenna is connected to 30 a second port associated with the baseband processor or vice versa. Antenna selections may, for example, be based on the evaluated signal quality of received signals. In addition to selecting which antenna(s) are to be used in receiving signals, the circuitry of device 10 may be used in adjusting the transceiver circuitry and baseband processor circuitry of device 10. For example, the circuitry of device 10 may be temporarily configured so that one or both of the antennas is used in monitoring a 1X paging channel for incoming 1X paging signals.

Device 10 may use any suitable number of antennas (e.g., two or more antennas, three or more antennas, etc.), but configurations in which two antennas are used are sometimes described herein as an example. Device 10 may use antennas that are substantially identical (e.g., in band coverage, in efficiency, etc.), or may use other types of antenna configurations.

Figure 2:
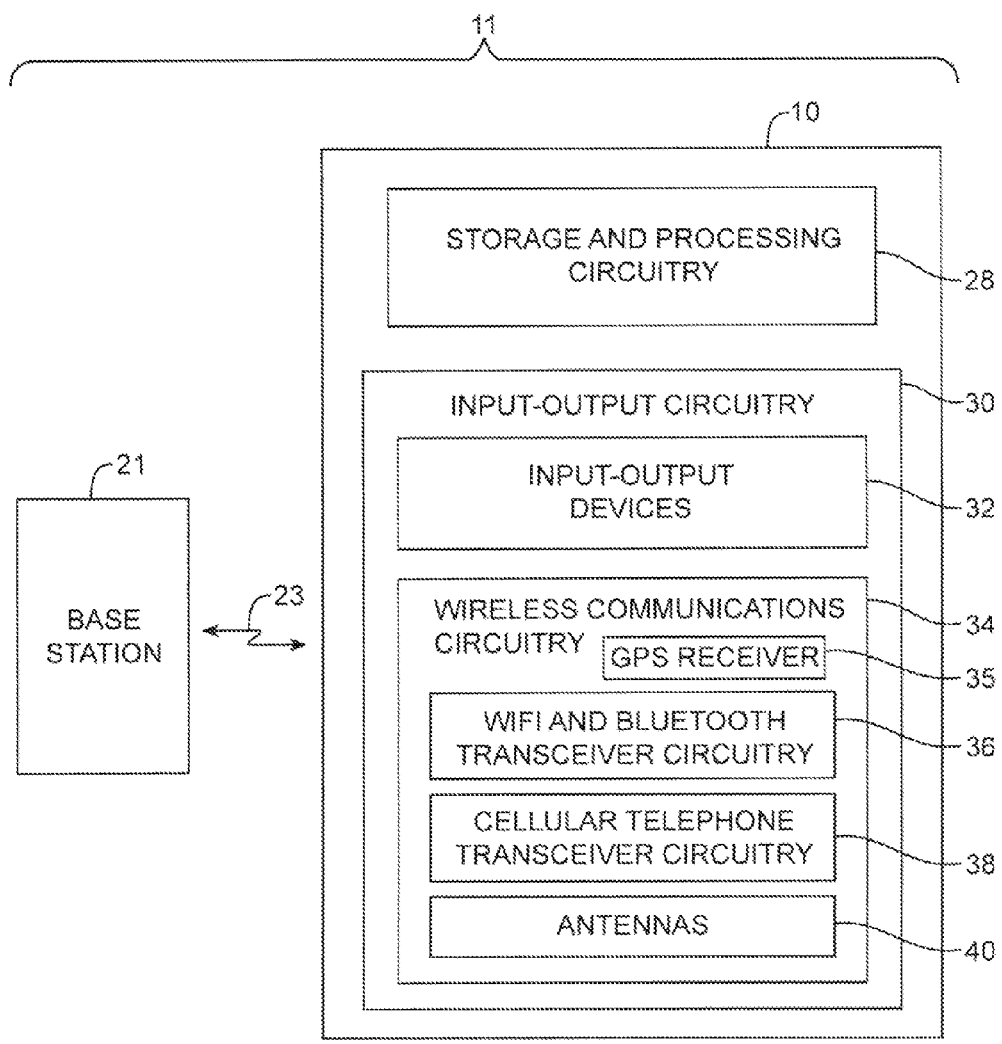
FIG. 2 is a schematic diagram of a wireless network including a base station and an illustrative electronic device with wireless communication circuitry in accordance with an embodiment of the present invention.

A schematic diagram of a system in which electronic device 10 may operate is shown in FIG. 2. As shown in FIG. 2, system 11 may include wireless network equipment such as base station 21. Base stations such as base station 21 may be associated with a cellular telephone network or other wireless networking equipment. Device 10 may communicate with base station 21 over wireless link 23 (e.g., a cellular telephone link or other wireless communication link).

Device 10 may include control circuitry such as storage and processing circuitry 28. Storage and processing circuitry 28 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in storage and processing circuitry 28 and other control circuits such as control circuits in wireless communication circuitry 34 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VoIP) telephone call applications, email applications, media playback applications, operating system functions, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE 802.16 (WiMAX) protocols, cellular telephone protocols such as the Long Term Evolution (LTE) protocol, Global System for Mobile Communications (GSM) protocol, Code Division Multiple Access (CDMA) protocol, and Universal Mobile Telecommunications System (UMTS) protocol, etc.

Circuitry 28 may be configured to implement control algorithms for device 10. The control algorithm may be used to control radio-frequency switching circuitry, transceiver circuitry, and other device resources. For example, the control algorithm may be used to configure wireless circuitry 34 to switch a particular antenna into use for transmitting and/or receiving signals or may switch multiple antennas into use simultaneously. The control algorithm may also be used to activate and deactivate transmitters and receivers, to tune transmitters and receivers to desired frequencies, to implement timers, to compare measured device operating parameters to predetermined criteria, etc.

In some scenarios, circuitry 28 may be used in gathering sensor signals and signals that reflect the quality of received signals (e.g., received pilot signals, received paging signals, received voice call traffic, received control channel signals, received data traffic, etc.). Examples of signal quality measurements that may be made in device 10 include bit error rate measurements, signal-to-noise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), reference symbol received power (RSRP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc. This information and other data may be used in controlling how the wireless circuitry of device 10 is configured and may be used in otherwise controlling and 30 configuring device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communication circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals.

Wireless communication circuitry 34 may include satellite navigation system receiver circuitry such as Global Positioning System (GPS) receiver circuitry 35 (e.g., for receiving satellite navigation system signals at 1575 25 30 MHz). Transceiver circuitry 36 may handle associated bands for WiFi® (IEEE 802.11) communications, for example, 2.4 GHz and 5 GHz bands, and may handle the 2.4 GHz Bluetooth® communications band. Circuitry 34 may use cellular telephone transceiver circuitry 38 for handling wireless communication in cellular telephone bands such as bands at 700 MHz, 850 MHz, 900 MHz, 1800 MHz, 1900 MHz, and 2100 MHz or other cellular telephone bands of interest. Wireless communication circuitry 34 can include circuitry for other short-range and long-range wireless links if desired (e.g., WiMAX circuitry, etc.). Wireless communication circuitry 34 may, for example, include, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communication circuitry 34 may include antennas 40. Antennas 40 may be formed using any suitable types of antenna. For example, antennas 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna (e.g., for handling WiFi® traffic or other wireless local area network traffic) and another type of antenna may be used in forming a remote wireless link antenna (e.g., for handling cellular network traffic such as voice calls and data sessions). As described in connection with FIG. 1, there may be multiple cellular telephone antennas in device 10. For example, there may be one cellular telephone antenna in region 24 of device 10 and another cellular telephone antenna in region 22 of device 30 10. These antennas may be fixed or may be tunable.

Figure 3:
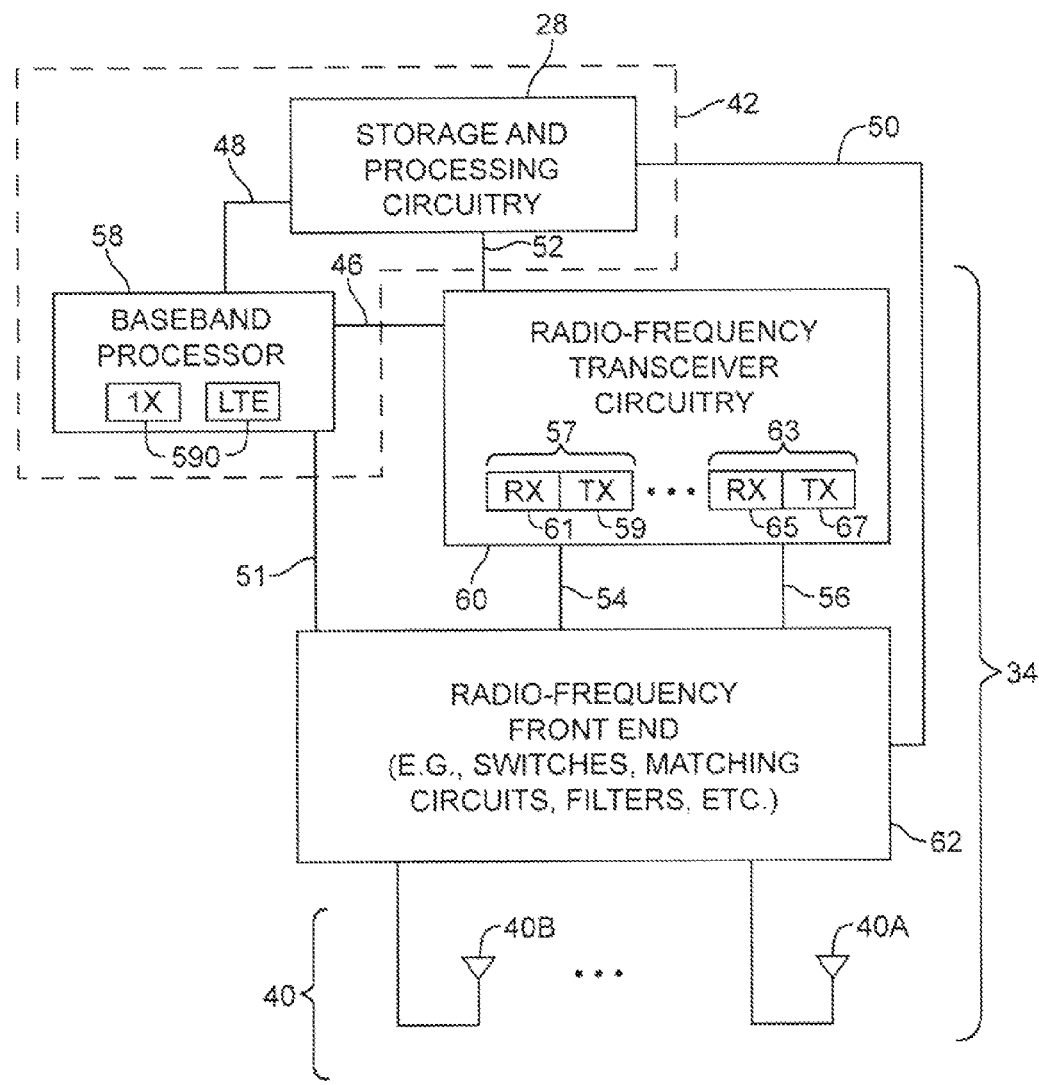
FIG. 3 is a diagram of illustrative wireless circuitry that may be used in an electronic device in accordance with an embodiment of the present invention.

Device 10 can be controlled by control circuitry that is configured to store and execute control code for implementing control algorithms. As shown in FIG. 3, control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of device 10).

Baseband processor 58 may provide data to storage and processing circuitry 28 (e.g., a microprocessor, nonvolatile memory, volatile memory, other control circuits, etc.) via path 48. The data on path 48 may include raw and processed data associated with wireless (antenna) performance metrics for received signals such as received power, transmitted power, frame error rate, bit error rate, channel quality measurements based on received signal strength indicator (RSSI) information, channel quality measurements based on received signal code power (RSCP) information, channel quality measurements based on reference symbol received power (RSRP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information on how many retransmissions are being requested over a cellular link between the electronic device and a cellular tower, information on whether a loss of signaling message has been received, information on whether paging signals have been successfully received, and other information that is reflective of the performance of wireless circuitry 34. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers such as transceivers 57 and 63. Some transceivers may include both a transmitter and a receiver. If desired, one or more transceivers may be provided with receiver circuitry, but no transmitter circuitry (e.g., to use in implementing receive diversity schemes). As shown in the illustrative configuration of FIG. 3, transceiver 57 may include a transmitter such as transmitter 59 and a receiver such as receiver 61 and transceiver 63 may include a transmitter such as transmitter 67 and a receiver such as receiver 65.

Baseband processor 58 may receive digital data that is to be transmitted from storage and processing circuitry 28 and may use path 46 and radio-frequency transceiver circuitry 60 to transmit corresponding radiofrequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and 20 processing circuitry 28. Baseband processor 58 may also extract information from received signals that is indicative of signal quality for the channel to which the transceiver is currently tuned. For example, baseband processor and/or other circuitry in control circuitry 42 may analyze received signals to produce bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect transceiver 57 to antenna 40B and transceiver 63 to antenna 40A or vice versa. Radio-frequency transceiver circuitry 60 may be configured by control signals received from storage and processing circuitry over path 52 and/or control signals received from baseband processor 58 over path 46.

The number of receivers and antennas that are used may depend on the operating mode for device 10. For example, in normal LTE operations, antennas 40A and 40B may be used with respective receivers 61 and 65 to implement a receive diversity scheme for device 10. With this type of arrangement, two LTE data streams may be simultaneously received and processed using baseband processor 58. When it is desired to monitor a 1X paging channel for incoming 1X pages, one or both of the antennas may be temporarily used in receiving 1X paging channel signals.

Control circuitry 42 may be used to run software for handling more than one radio access technology. For example, baseband processor 58 may include memory and control circuitry for implementing multiple protocol stacks 590 such as protocol stack 1X and protocol stack LTE. Protocol stack 1X may be associated with a first radio access technology such as CDMA2000 1XRTT (as an example) Protocol stack LTE may be associated with a second radio access technology such as LTE (as an example). During operation, device 10 may use protocol stack 1X to handle 1X functions and may use protocol stack LTE to handle LTE functions. Additional protocol stacks, additional transceivers, additional antennas 40, and other additional hardware and/or software may be used in device 10 if desired. The arrangement of FIG. 3 is merely illustrative.

It may be desirable to minimize the cost and complexity of device 10 by implementing the wireless circuitry of FIG. 3 using an arrangement in which baseband processor 58 and radio-transceiver circuitry 60 can be used to support both LTE and 1X traffic.

The 1X radio access technology may generally be used to carry voice traffic, whereas the LTE radio access technology may generally be used to carry data traffic. To ensure that 1X voice calls are not interrupted due to LTE data traffic, 1X operations may take priority over LTE operations. To ensure that operations such as monitoring a 1X paging channel for incoming paging signals do not unnecessarily disrupt LTE operations, control circuitry 42 can, whenever possible, configure the wireless circuitry of device 10 so that wireless resources are shared between LTE and 1X functions.

When a user has an incoming 1X call, the 1X network may send device 10 a paging signal (sometimes referred to as a page) on the 1X paging channel using base station 21. When device 10 detects an incoming page, device 10 can take suitable actions (e.g., call establishment procedures) to set up and receive the incoming 1x call. Pages are typically sent several times at fixed intervals by the network, so that devices such as device 10 will have multiple opportunities to successfully receive a page.

Proper 1X page reception requires that the wireless circuitry of device 10 be periodically tuned to the 1X paging channel. If the transceiver circuitry 60 fails to tune to the 1X paging channel or if the 1X protocol stack in baseband processor 58 fails to monitor the paging channel for incoming pages, 1X pages will be missed. On the other hand, excessive monitoring of the 1X paging channel may have an adverse impact on an active LTE data session.

To conserve power, it may be desirable for the 1X and LTE protocol stacks to support idle mode operations (sometimes referred to as sleep mode functionality). During 1X idle mode, 1X voice operations that can be supported include decoding/monitoring the quick paging channel (Q-PCH) when this feature has been enabled by the network operator, decode/monitor the paging channel, re-registering the device (if the device moves out of its previous registration zone), initiating a system scan when a device enters an out-of-service condition, and reading overhead messages on the network control channel (e.g., messages conveying information such as base station identifier information, network identifier information, information on which optional features have been enabled by the network operator, etc.).

Three potential operating states may be associated with idle mode operation: wake mode, sleep mode, and out-of-service sleep mode.

When in wake mode, the device is monitored for pages from the network and is monitored to determine whether device 10 is in service. If the device is not receiving a page and is in service, the device may be placed in sleep mode. If the device is out of service, a system scan may be 30 performed to identify an available network. If no service is available, an out-of-service indicator may be displayed and the device may be placed in the out-of-service sleep mode for a period of time. Upon awakening from the out-of-service sleep mode, the device can once again search for service. If service is detected, the device may be placed in sleep mode.

Periodically, the device should be awakened from sleep mode into wake mode. If the device receives a page during wake mode, a communication link may be established. For example, in a 1X network, call setup operations may be performed to establish a 1X call (e.g., a voice call). Once the call is complete, the device may be returned to sleep mode.

This sleep-wake paging cycle may be repeated continuously during operation of device 10. Each paging cycle, the device may be awakened for a period of time to monitor the paging channel for incoming pages. To conserve power, the device is then returned to sleep mode unless an incoming page is detected.

Device 10 can support active and idle mode operations for both the 1X and LTE radio access technologies. The ability of device 10 to support both 1X and LTE operations concurrently using wireless circuitry 34 and control circuitry 42 depends on the 1X and LTE modes of operation.

Consider, as an example, the situation in which baseband processor 58 and protocol stack 1X are being used to support 1X operations in idle mode while baseband processor 58 and protocol stack LTE are being used to support LTE operations in either idle mode or active mode. If the signal strength on the 1X paging channel is sufficient, one of the antennas in device 10 (e.g., antenna 40B or 40A of FIG. 3) may be temporarily used for 1X paging channel monitoring operations, rather than for LTE operations. Although this temporarily occupies one of the two antennas that are normally used to implement receive diversity for LTE operations, the remaining antenna in wireless circuitry 34 may still be used to handle LTE traffic. Environments where 1X paging signal strength is sufficient to allow incoming pages to be received using only a single 1X antenna therefore allow device 10 to operate in either LTE idle or active modes while simultaneously operating in 1x idle mode.

In environments in which device 10 is able to support active 1X operations using a single antenna (i.e., because 1X signal strengths are sufficiently strong), the remaining antenna may be used to support LTE idle mode operations.

Figure 4:
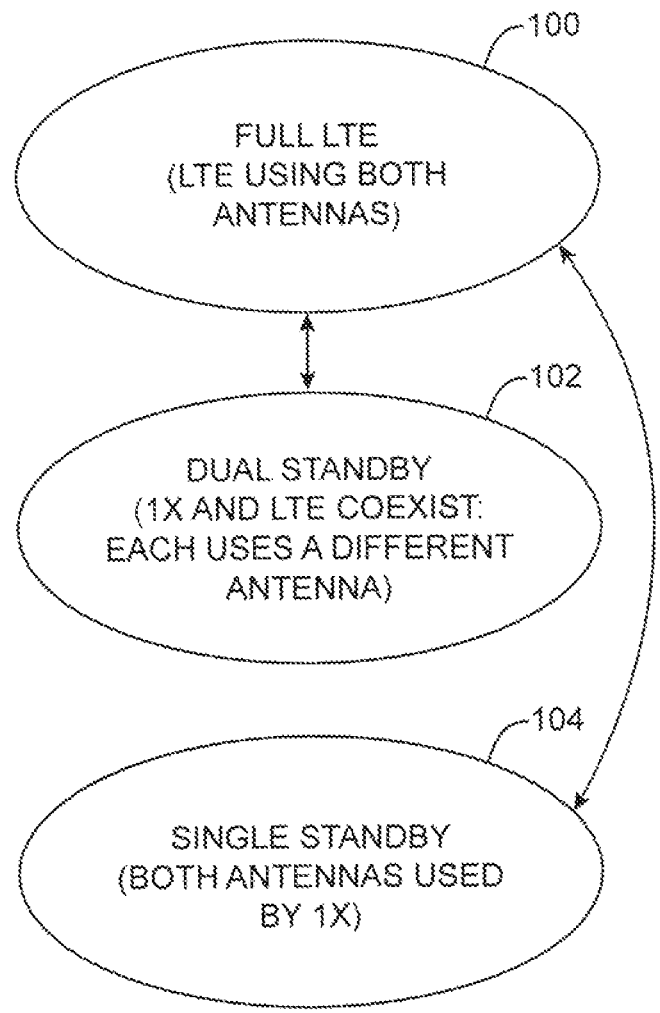
FIG. 4 is a diagram showing various modes of operation that may be used in a wireless electronic device in accordance with an embodiment of the present invention.

FIG. 4 is a state diagram showing how device 10 may transition between different states during operation. During normal operations in which LTE traffic is being conveyed between device 10 and network 23, device 10 may use both antennas (e.g., antennas 40A and 40B of FIG. 3), as illustrated by state 100. The simultaneous use of two antennas allows device 10 to implement a receive diversity scheme that is compliant with LTE protocols. During the operations of state 100, protocol stack LTE may be used in receiving and processing two separate incoming streams of LTE traffic. For example, receiver 61 and one of antennas 40 may be used in receiving a first LTE traffic stream and receiver 65 and a second of antennas 40 may be used in receiving a second LTE traffic stream. Baseband processor 58 may be provided with these two parallel LTE data streams over path 46 and may combine the incoming traffic into data for circuitry in device 10 such as storage and processing circuitry 28. In configurations in which device 10 uses a single radio-frequency transmitter (e.g., transmitter 59) for transmitting LTE data, circuitry 42 may configure radiofrequency transceiver circuitry 60 and radio-frequency front-end circuitry 62 so that the transmitted signals from transmitter 59 are routed to either antenna 40A or antenna 40B. LTE dual-antenna idle mode operations may also be performed in state 100.

To ensure that device 10 does not miss incoming 1X calls, device 10 may periodically transition to a state in which some or all LTE functionality is reduced and in which 1X page monitoring activities are performed. Control circuitry 42 of device 10 may, for example, periodically transition device 10 to state 102 or state 104 of FIG. 4.

Control circuitry 42 may use signal quality measurements (e.g., received signal strength indicators or other measurements of received signal quality) to determine whether to transition to state 102 or state 104. If signal quality is sufficient, device 10 may transition to state 102, where one antenna is used for LTE and one antenna is used for 1X (e.g., 1X active mode operations or 1X page monitoring activities). If signal quality is lower, the use of multiple antennas to handle 1X page monitoring activities may be desired, so device 10 may transition to state 104, in which two antennas are used for 1X operations (e.g., in monitoring the 1X paging channel for incoming pages).

Examples of signal quality measurements that may be made in device 10 to determine whether include bit error rate measurements, signal-to-noise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), reference symbol received power (RSRP measurements), channel quality measurements based on signal-to-interference ratio (SINR) and signal-to-noise ratio (SNR) information (SINR and SNR measurements), channel quality measurements based on signal quality data such as Ec/Io or Ec/No data (Ec/Io and Ec/No measurements), etc.

With one illustrative arrangement, device 10 will transition from state 100 to state 102 to perform 1X page monitoring operations provided that the 1X signal quality has an RSSI value of greater than threshold TH1 and will transition from state 100 to state 104 to perform 1X page monitoring operations when the 1X signal quality has an RSSI value of less than TH1. Other signal quality measurements and thresholds may be used by control circuitry 42 to determine whether to transition to state 102 or state 104. The use of RSSI signal quality measurements is merely an example.

Figure 5:
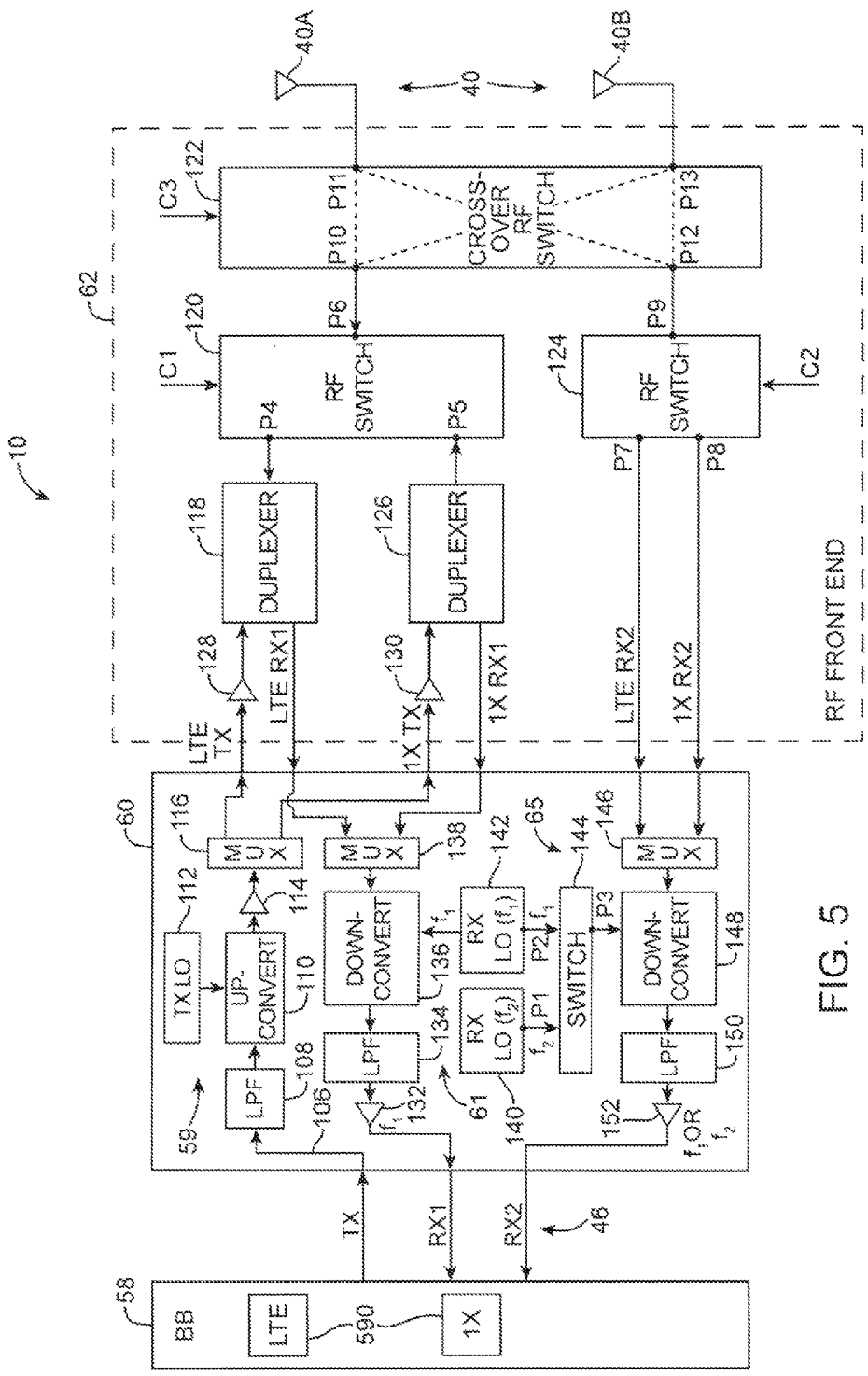
FIG. 5 is a circuit diagram showing illustrative circuitry that may be used in implementing a wireless electronic device in accordance with an embodiment of the present invention.

FIG. 5 is a circuit diagram showing illustrative circuitry that may be used in implementing device 10. In the illustrative example of FIG. 5, device 10 has two antennas—antenna 40A and 40B. If desired, device 10 may have additional antennas 40, as described in connection with FIG. 3. Device 10 of FIG. 5 has radio-frequency transceiver circuitry 60 that includes two receivers (receiver circuitry 61 and receiver circuitry 65) and a transmitter (transmitter circuitry 59). Baseband processor 58 has protocol stacks 590 such as protocol stack LTE for handling LTE operations and protocol stack 1X for handling 1X operations. Path 46 may be used to couple baseband processor 58 to radiofrequency transceiver circuitry 60. Radio-frequency transceiver circuitry 60 may be coupled to antennas 40A and 40B via radio-frequency front end circuitry 62.

Data from baseband processor 58 may be conveyed to transmitter circuitry 59 via path TX in path 46. Path 106 may be used to convey data that is to be transmitted to low-pass filter 108. Transmitter local oscillator 112 may supply a local oscillator output signal to up-converter circuit 110. Up-converter circuit 110 may upconvert the data signal from low-pass filter 108 and supply a corresponding radio-frequency output signal to amplifier 114. Amplifier 114 may amplify the radio-frequency signal version of the transmitted data and provide this signal to multiplexer circuit 116 (or other suitable switching circuitry). Multiplexer 116 may supply the data to path LTE TX when the transmitted data is LTE data that is being provided by protocol stack LTE and may supply the data to path 1X TX when the transmitted data is 1X data that is being provided by protocol stack 1X. The state of multiplexer circuit 116 and other circuits in transceiver 60 may be controlled by control signals supplied by baseband processor 58 and/or storage and processing circuitry 28 (e.g., control circuitry 42 of FIG. 3).

Radio-frequency front-end circuitry 62 may include filter and switching circuitry for routing incoming and outgoing signals between transceiver circuitry 60 and antennas 40A and 40B. For example, radio-frequency frontend circuitry 62 may contain switching circuitry that implements the functions of a crossover (double-pole-double-throw) switch such as switch 122. The state of switch 122 may be controlled by control signals received on path C3 from control circuitry 42. In a first state, switch 122 may route signals between port P10 and P11 and may route signals between port P12 and P13. In a second (reversed) state, switch 122 may connect port P10 to port P13 and may connect port P12 to port P11.

The state of switch 122 may be used to control which receiver and transmitter circuitry is coupled to each antenna. For example, the state of switch 122 may be used to control whether transmitted signals are transmitted through antenna 40A or antenna 40B. When it is in its first state, transmitted signals such as LTE signals from path LTE TX or 1X signals from path 1X TX may be transmitted through antenna 40A. When it is in its second state, transmitted signals such as LTE signals from path LTE TX or 1X signals from path 1X TX may be transmitted through antenna 40B.

Transmitted LTE signals on path LTE TX may be amplified by amplifier 128. Duplexer filter circuitry 118 may route signals based on their frequency. Incoming radiofrequency signals that are received from port P4 of switch 120 may be routed to path LTE RX1. Transmitted signals from the output of amplifier 128 may be routed to port P4 of switch 120.

Transmitted 1X signals on path 1X TX from multiplexer 116 may be amplified by amplifier 130. Duplexer filter circuitry 126 may route signals based on their frequency. Radio-frequency signals that are received from port P5 of switch 120 may be routed to path 1X RX1. Transmitted signals from the output of amplifier 130 may be routed to port P5 of switch 120.

Radio-frequency switching circuitry in radiofrequency front-end circuitry 62 such as radio-frequency switch 120 may be controlled by control signals from control circuitry 42 that are received on control signal path C1. In a first state, radio-frequency switch 120 may couple port P6 to port P4, in a second state, radio-frequency switch 120 may couple port P6 to port P5. When ports P4 and P6 are connected, received radio-frequency signals from antenna structures 40 may be routed from port P6 to port P4 and transmitted radio-frequency signals may be routed from port P4 to port P6 for transmission via antenna structures 40. When ports P5 and P6 are connected, received radio-frequency signals from antenna structures 40 may be routed from port P6 to port P5 and transmitted radio-frequency signals may be routed from port P5 to port P6 for transmission via antenna structures 40.

Radio-frequency front-end circuitry 62 may also include radio-frequency switching circuitry such as radio-frequency switch 124. Radio-frequency switch 124 may be configured by control circuitry 42. In particular, radiofrequency switch 124 may receive control signals from control circuitry 42 on control signal input path C2. In response to the control signals received on path C2, radio-frequency switch 124 may be placed in a first state in which ports P7 and P9 are connected together or in a second state in which a signal path is formed between ports P8 and P9. In its first state (i.e., when configuring switch 124 to receive LTE traffic), received signals from crossover switch 122 may be routed from port P9 to port P7 and associated signal path LTE RX2. In its second state (i.e., when configuring switch 124 to receive 1X traffic), received signals from crossover switch 122 may be routed from port P9 to port P8 and associated signal path 1X RX2.

Switching circuitry associated with radio-frequency transceiver circuitry 60 may be used in selectively routing signals from the four receive paths (LTE RX1, 1X RX1, LTE RX2, and 1X RX2) in radio-frequency frontend circuitry 62 to receiver circuits 61 and 65. Multiplexer 138 may, for example, receive incoming radio-frequency signals on paths LTE RX1 and 1X RX1 and may route signals from a selected one of these paths to downconverter circuit 136 of receiver 61. Multiplexer 146 may receive incoming radio-frequency signals on paths LTE RX2 and 1X RX2 and may route signals from a selected one of these paths to downconverter circuit 148 of receiver 65.

Local oscillators RX LO may produce local oscillator output signals for receivers 61 and 65. As shown in FIG. 5, for example, local oscillator 140 may produce a radio-frequency output signal at frequency f2 that is received at port P1 of switching circuitry 144. Local oscillator 142 may produce radio-frequency output signals at frequency f1 that are provided to port P2 of switch 144 and to downconverter circuit 136 in receiver 61. The state of switching circuitry 116, 138, 146, and 144 may be controlled by control signals received from control circuitry 42 (e.g., baseband processor 58 and/or storage and processing circuitry 28).

When it is desired to handle LTE signals with receiver 61, multiplexer 138 may be used to route signals from path LTE RX1 to downconverter circuitry 136. After mixing with the local oscillator output from local oscillator 142, the LTE signal from path LTE RX1 may be provided to baseband processor 58 via low-pass filter 134, amplifier 132, and path RX1. Baseband processor 58 may use protocol stack LTE to process the received LTE signals.

When it is desired to handle 1X signals with receiver 61, multiplexer 138 may be used to route signals from path 1X RX1 to downconverter circuitry 136. After mixing with the local oscillator output from local oscillator 142, the 1X signal from path 1X RX1 may be provided to baseband processor 58 via low-pass filter 134, amplifier 132, and path RX1. Baseband processor 58 may use protocol stack 1X to process the received 1X signals.

When it is desired to handle LTE signals with receiver 65, multiplexer 146 may be used to route signals from path LTE RX2 to receiver 65. When it is desired to handle 1X signals with receiver 65, multiplexer 146 may be used to route signals from path 1X RX2 to receiver 65.

The state of switch 144 may be used to determine whether downconverter circuitry 148 is provided with the local oscillator output of local oscillator 140 at frequency f2 or the local oscillator output of local oscillator 142 at frequency f1. Switch 144 may be configured to couple port P1 to port P3 when it is desired to provide downconverter 148 with the output of local oscillator 140 at f2 and may be configured to couple port P2 to port P3 when it is desired to provide downconverter 148 with the output of local oscillator 142 at frequency f1. After mixing the received 1X or LTE signal from the output of multiplexer 146 with the local oscillator output from local oscillator 142 or the local oscillator output from local oscillator 140, downconverter circuitry 148 may supply the received 1X or LTE signal to baseband processor 58 via low-pass filter 150, amplifier 152, and path RX2 in path 46. Baseband processor 58 may use protocol stack LTE to process LTE signals from path LTE RX2 and protocol stack 1X to process 1X signals from path 1X RX2.

In operating states in which it is desired to implement receive diversity, switch 144 may be configured to route the output of local oscillator 142 at frequency f1 to downconverter 148. Downconverter 136 may simultaneously receive the output of local oscillator 142 at frequency f1. In this configuration, receivers 61 and 65 may each receive incoming radio-frequency signals at the same frequency (i.e., frequency f1) and may therefore be used in implementing a two-antenna receive diversity configuration for incoming LTE or 1X signals.

When signal strengths (e.g., a received signal strength indicator or other signal quality indicator information) indicate that a single antenna may be used in receiving 1X paging signals, one of the antennas 40A and 40B and one of receivers 61 and 65 may be used in receiving LTE signals and the other of antennas 40A and 40B and the other of receivers 61 and 65 may be used in receiving 1X signals. When using each receiver in radio-frequency transceiver circuitry 60 to handle a different type of traffic, switch 144 may be configured to route the output of local oscillator 140 at frequency f2 to downconverter circuitry 148. Receiver 61 may then be used to receive incoming signals at a first frequency (f1) while receiver 65 is used to simultaneously receive incoming signals at a second frequency f2 that is different than the first frequency. Depending on the way in which circuitry 60 and circuitry 62 is configured, LTE traffic may be handled by receiver 61 (i.e., LTE traffic from path LTE RX1) while 1X traffic is handled by receiver 65 (i.e., 1X traffic from path 1X RX2) or LTE traffic may be handled by receiver 65 (i.e., LTE traffic from path LTE RX2) while 1X traffic is handled by receiver 61 (i.e., 1X traffic from path 1X RX1).

FIG. 6 is a table illustrating how device 10 may operate under various possible combinations of 1X and LTE activity. Some potential combinations of 1X and LTE activities may be handled satisfactorily using circuitry of the type shown in FIG. 5, while others may lead to resource conflicts.

Consider, as an example, scenarios in which 1X functionality in device 10 is idle (i.e., there is no active 1X voice call being handled by device 10 and device 10 is periodically monitoring the 1X paging channel for incoming calls) and in which received 1X signal strength (as indicated by measured RSSI values or other signal quality factors) is sufficient to allow device 10 to monitor the 1X paging channel using only a single one of the two antennas in device 10. These scenarios are represented by the first row of the table of FIG. 6. As shown in the first row of the table of FIG. 6, device performance may be satisfactory when device 10 is operating in an LTE idle state (monitoring for incoming LTE pages) and may be somewhat degraded when device 10 is operating in an LTE active state.

Figure 7:
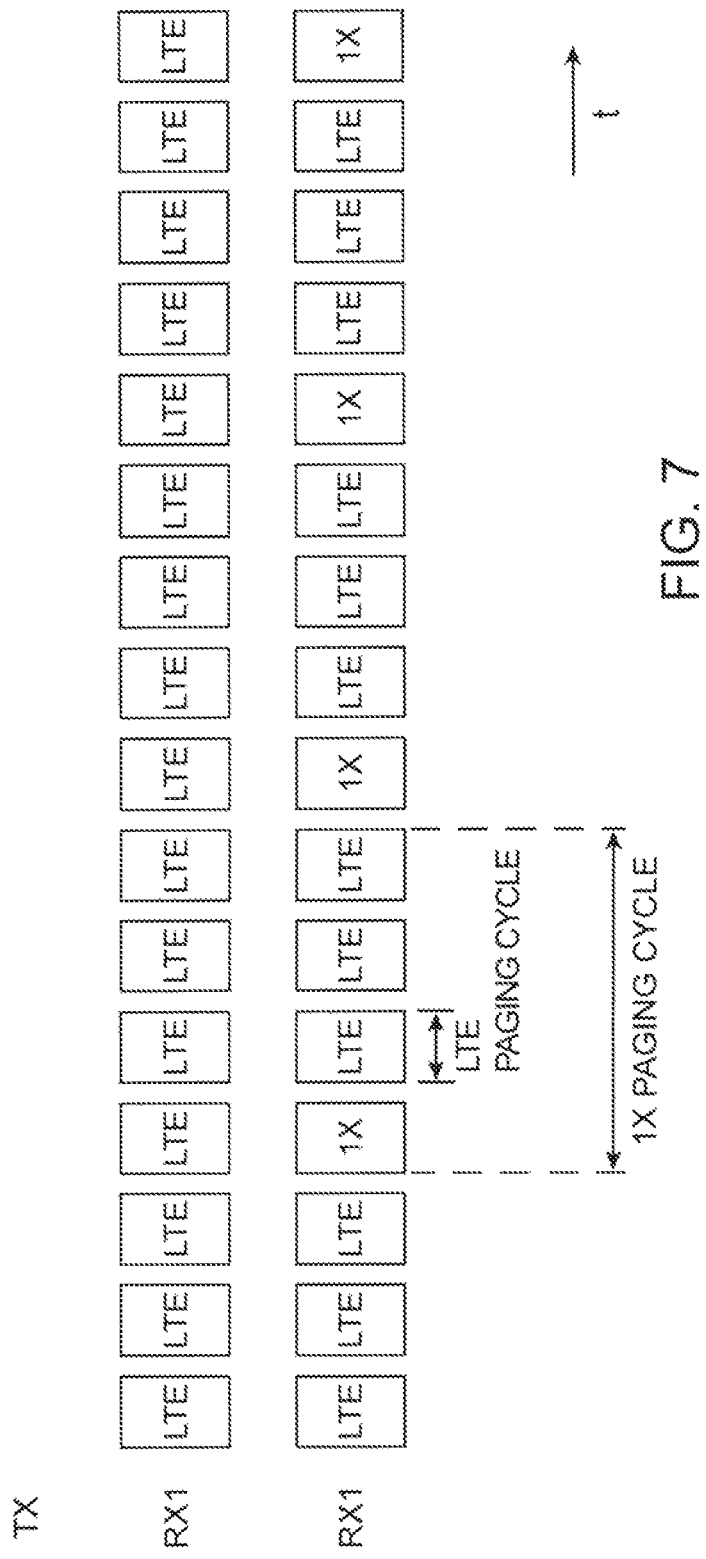
FIG. 7 is a timing diagram showing how an electronic device may support operation in an idle mode for a first radio access technology using one antenna while supporting operation in an idle mode for a second radio access technology using another antenna in accordance with an embodiment of the present invention.

FIG. 7 illustrates the type of wireless activity that may occur during use of device 10 to handle LTE idle and 1X idle operations (the left-hand column of the first row of the table of FIG. 6). Because LTE and 1X functions are idle, there is no activity associated with transmitter TX. During most periods of time, the switching circuitry in radio-frequency transceiver 60 and radio-frequency front-end circuitry 62 may be configured to route incoming antenna signals to paths LTE RX1 and LTE RX2. Switch 144 may be configured so that receiver 61 and receiver 65 receive the signals on paths LTE RX1 and LTE RX2 using the same local oscillator frequency (f1) (i.e., device 10 may be configured to use both antennas in a receive diversity mode to monitor the LTE paging channel at frequency f1 for incoming LTE pages). Periods of time in which LTE page monitoring is performed are indicated by the presence of "LTE" page monitoring boxes for both the first receiver (RX1) and second receiver (RX2) in FIG. 7. First receiver RX1 may, for example, correspond to receiver 61 and second receiver RX2 may, for example, correspond to receiver 65 (or vice versa).

The 1X paging cycle may be longer than the LTE paging cycle. As a result, device 10 may periodically need to use the second receiver RX2 to monitor the 1X paging channel instead of the LTE paging channel. To support this type of operation, the configuration of radio-frequency transceiver circuitry 60 and radio-frequency front-end circuitry 62 may be reconfigured by control circuitry 42. In particular, switch 144 may be configured to couple port P1 to port P3, so that receiver 65 operates at frequency f2 while receiver 61 operates at frequency f1. Switch 120 may be configured to couple port P6 to port P4 to route received signals from one of the antennas to path LTE RX1. Switch 124 may be configured to couple port P9 to port P8 to route received signals from the other of the antennas to path 1X RX2. In the example of FIG. 5, switching circuitry is used to route signals. In configurations in which there are only two radio-frequency bands involved, diplexer circuitry may be used to route signals in device 10. The use of switching circuitry such as the switching circuitry of FIG. 5 may be preferred when more radio-frequency bands are involved.

As shown in FIG. 7, 1X pages and LTE pages can be simultaneously monitored by periodically using receiver RX2 to monitor the 1X paging channel for incoming pages rather than LTE signals. During these time periods (which are illustrated by the boxes labeled "1X" in FIG. 7), one of the antennas in device 10 is used to provide signals to path 1X RX2 while circuitry 60 monitors the signals on this path (at frequency f2) for incoming 1X pages. At the same time, LTE idle (page monitoring) operations can be performed using the remaining one of the antennas and circuitry RX1. Although both antennas and receivers cannot be simultaneously used in monitoring LTE pages during the period in which one of the antennas is being used to monitor 1X pages, this periodic momentary loss of receive diversity for monitoring the LTE paging channel is generally acceptable. Performance is therefore satisfactory, as indicated in the left-hand column of the first row of the table of FIG. 6.

Figure 8:
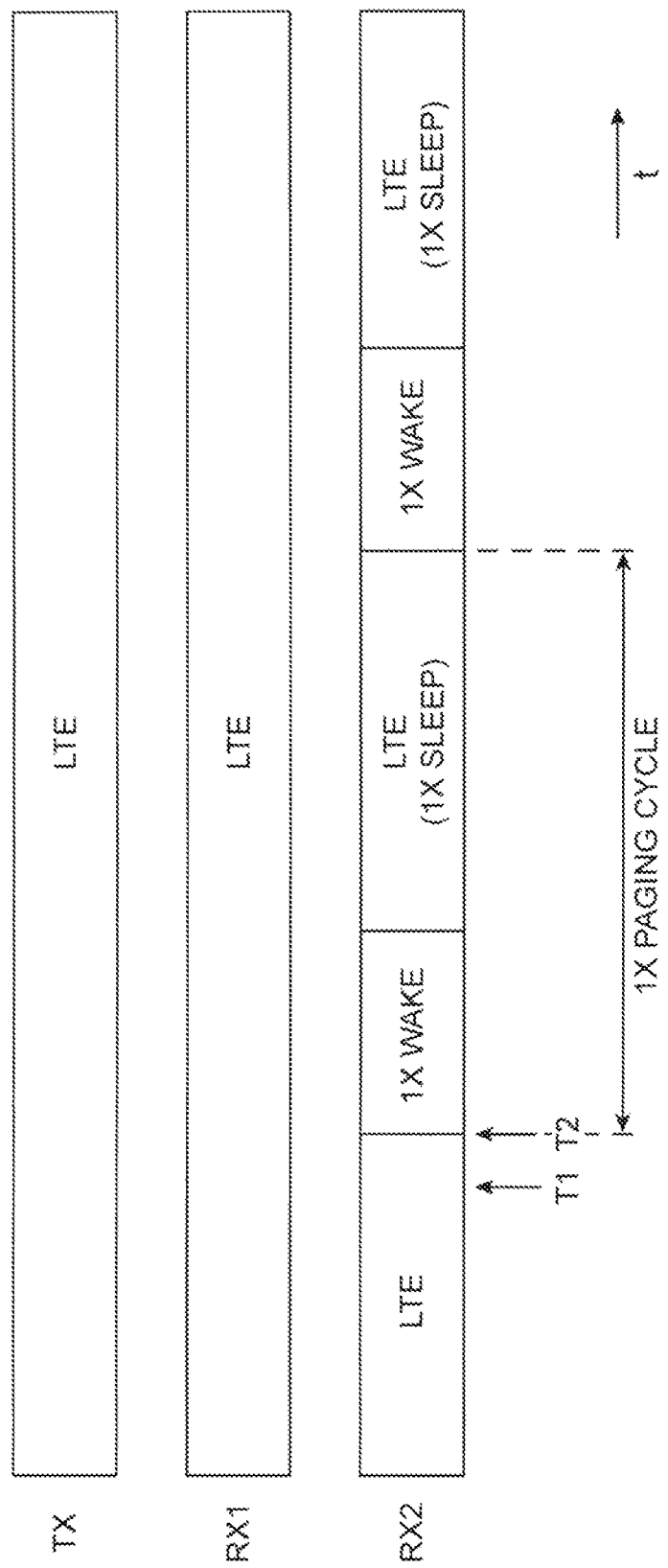
FIG. 8 is a timing diagram showing how an electronic device may support an active data session using a first radio access technology while periodically using one of the antennas in the device to monitor a paging channel associated with a second radio access technology in accordance with an embodiment of the present invention.

As illustrated by the entry in the right-hand column of the first row of the table of FIG. 6, LTE performance may be degraded somewhat when attempting to operate device 10 in an LTE active state while simultaneously monitoring the 1X channel for pages (i.e., operating the device in a 1X idle mode). FIG. 8 is a diagram showing how device 10 may operate in this situation. As shown in FIG. 8, transmitter TX may be used to transmit LTE data (e.g., using path LTE TX of FIG. 5 and an associated one of antennas 40).

In the example of FIG. 8, LTE data is initially being received by device 10 using a receive diversity arrangement. For example, at times such as time T1 of FIG. 8, before it is desired to monitor the 1X paging channel for pages, LTE data may be received using both antennas and using corresponding receivers RX1 and RX2. When it is desired to monitor the 1X channel for pages, normal LTE receive diversity operations may be interrupted. In particular, LTE receive diversity operations may be periodically interrupted (for the periods of time labeled "1X WAKE" in FIG. 8) to allow the antenna that is associated with receiver RX2 to monitor the 1X paging channel for incoming 1X pages.

The transition between LTE receive diversity mode and the 1X page monitoring operations of periods "1X WAKE" in FIG. 8 may take place at times such as time T2. Several transmission time intervals before time T2 (and before each subsequent entry into the 1X WAKE state), device 10 may send a rank indicator of 1 to the network (e.g., base station 21 of FIG. 2). The rank indicator of 1 (or other suitable channel quality indicator) directs the network to transmit data in a single layer only (i.e., in only one of the two simultaneous LTE data paths that are normally transmitted during receive diversity operations). This helps avoid data loss when one of the two LTE data paths becomes unavailable during 1X paging channel monitoring. While the 1X paging channel is being monitored during period 1X WAKE, the remaining incoming LTE data stream can be handled by receiver RX1 and transmitter TX may be used for transmitting LTE data. Following period 1X WAKE, 1X operations cease (go to sleep) and (during period 1X SLEEP), use of the antenna and receiver that were temporarily used for 1X page monitoring may be returned to use in receiving one of the LTE data streams with device 10 sending a corresponding rank indicator to the LTE network (or other suitable channel quality indicator).

With arrangements of the type described in connection with FIG. 8 (and the right-hand side of the first row of the table of FIG. 6), there is no interruption in LTE service, but there is a degradation in received LTE data throughput due to the temporary loss of the second antenna and receiver for receiving LTE data during periods 1X WAKE.

In some situations, received signal quality is poor, so it is not desirable to attempt to receive 1X paging signals using only a single antenna. When device 10 detects that this type of a situation has arisen, 1X page monitoring activities (1X idle mode activities) may be performed using both antennas (i.e., antennas 40A and 40B) and corresponding receivers 61 and 65 in transceiver circuitry 60. As indicated on the left-hand side of the second row of the table of FIG. 6, 1X idle operations and LTE idle operations can be performed simultaneously if their paging instances do not collide. As indicated on the right-hand side of the second row of the table of FIG. 6, attempts at performing 1X idle operations and LTE active mode operations simultaneously will result in interrupted LTE operations.

During operations 1X idle mode and LTE idle mode, switch 120 may be configured to couple port P6 to port P5 to route received signals to path 1X RX1. Switch 124 may be configured to route received signals to path 1X RX2. Switch 144 may be configured to route the signals from local oscillator 142 to port P3, so that signals on path RX2 and on path RX1 correspond to the same frequency. The frequency may be adjusted depending on whether device 10 is monitoring the LTE paging channel or the 1X paging channel.

Figure 9:
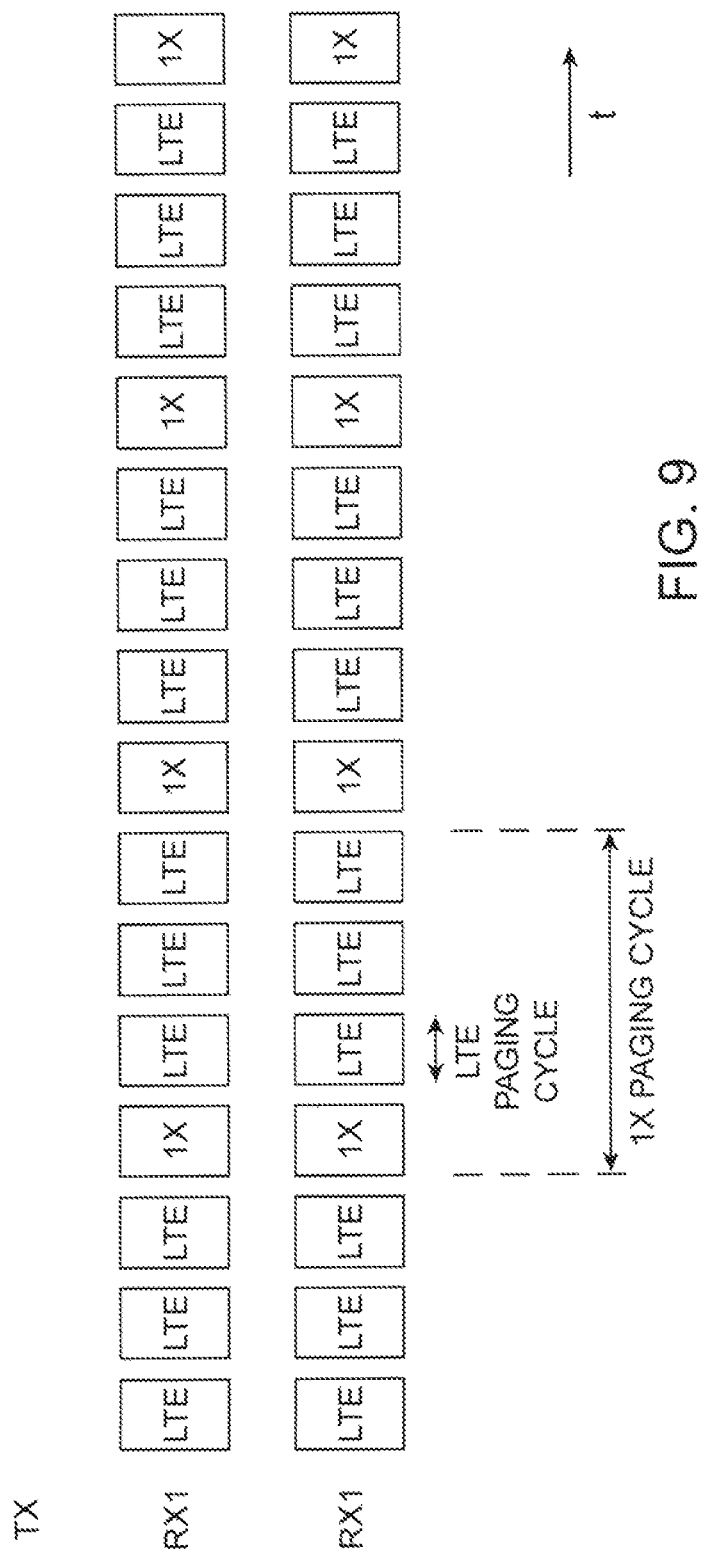
FIG. 9 is a timing diagram showing how an electronic device may monitor a paging channel associated with a first radio access technology while periodically being adjusted to use multiple antennas to monitor a paging channel associated with a second radio access technology in accordance with an embodiment of the present invention.

FIG. 9 is a diagram showing how device 10 may operate when performing simultaneous 1X idle mode and LTE idle mode operations. LTE is in idle mode, so transmitter TX is not being used to transmit LTE data (in this example). During some time periods (labeled "LTE" in FIG. 9), the LTE paging channel may be monitored for LTE pages. Both antennas and receivers 61 and 65 may be used in performing these monitoring operations (i.e., device 10 may be operated in an LTE receive diversity mode). Every 1X paging cycle, transceiver circuitry 60 may be tuned to the 1X paging channel so that 1X pages can be monitored, as indicated by the boxes in FIG. 9 that are labeled "1X". Because device has detected that signal quality is relatively low in this example (e.g., because RSSI was measured to be less than a predetermined threshold during the wake period of a preceding paging cycle), device 10 (e.g., control circuitry 42) configures wireless circuitry 34 so that 1X pages are monitored using 1X receive diversity (i.e., using both antennas 40 and using both receivers 61 and 65). The use of 1X receive diversity improves signal reception, albeit at the expense of periodically resulting in a missed LTE paging cycle.

Figure 10:
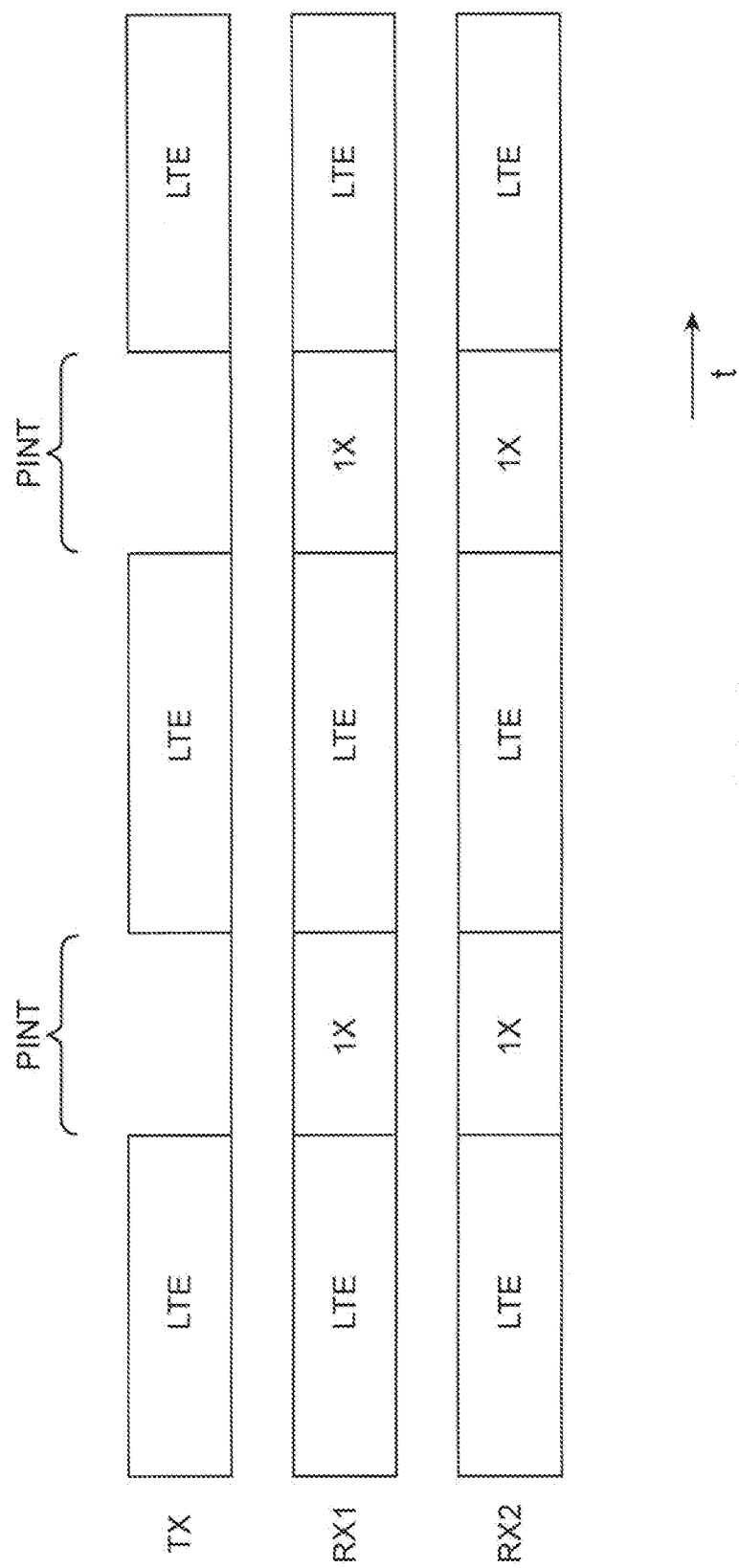
FIG. 10 is a timing diagram showing how an electronic device may operate an active mode for a first radio access technology while periodically being interrupted to support use of multiple antennas to monitor a paging channel associated with a second radio access technology in accordance with an embodiment of the present invention.

The diagram of FIG. 10, which corresponds to attempted simultaneous 1X idle mode and LTE active mode operations (the right-hand side of the second row of the table of FIG. 6) shows how LTE operations are periodically interrupted during periods PINT (i.e., when both antennas are used for monitoring 1X pages in a 1X receive diversity mode). Device 10 may inform the network (base station 21 of FIG. 2) of each expected LTE interruption by sending a rank indicator of 0 (or other suitable channel quality indicator) to the network several transmission time intervals (TTIs) before each 1X page monitoring period directing the network to reduce data transmissions. In response, the network will stop or at least reduce data transmissions to device 10 during periods PINT, minimizing the impact of the LTE service interruptions during periods PINT.

Device operation may be satisfactory in situations in which it is desired to simultaneously perform 1X active mode operations with one antenna and LTE idle mode operations, as indicated on the left-hand side of the third row of the table of FIG. 6. Device 10 may be configured to handle this scenario by placing switch configuring switch 120 to couple port P6 to port P5 to route received signals from a first antenna to path 1X RX and to route transmitted 1X signals from path 1X TX to the first antenna, by configuring switch 124 to couple port P9 to port P7 to route received signals from a second antenna to path LTE RX2, and by configuring switch 144 to couple port P1 to port P3, so that receivers 65 and 61 operate at frequencies f2 and f1, respectively. When in the 1X non-receive-diversity mode (one antenna), one of the antennas, transmitter 59, one of the receivers in device 10, and baseband processor 58 are being used to handle 1X traffic, so there are insufficient resources available to handle the simultaneous transmission and reception of LTE traffic (i.e., LTE active mode operations cannot be supported), as indicated by the entry on the right-hand side of the third row of the table of FIG. 6.

Figure 11:
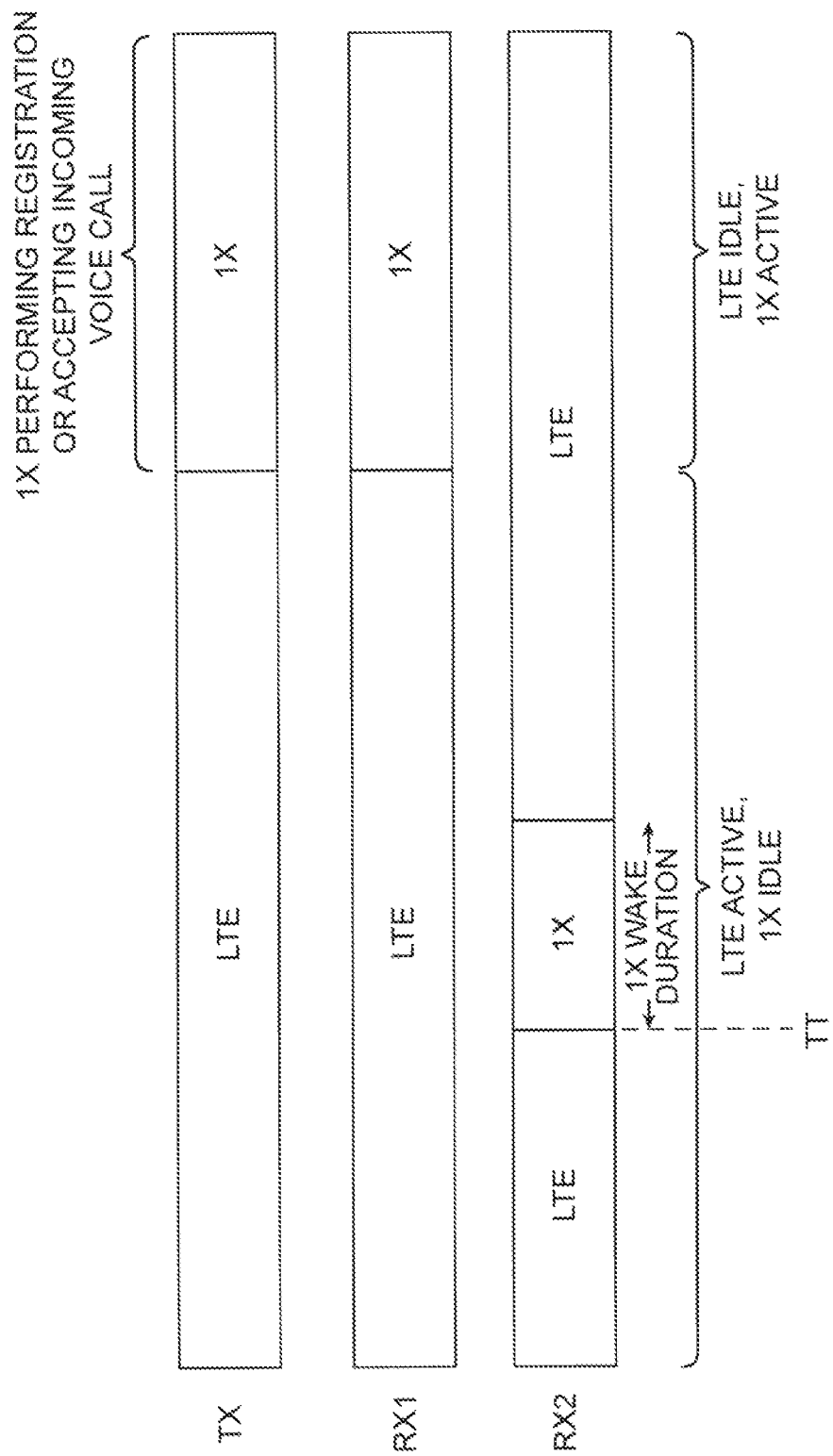
FIG. 11 is a timing diagram showing how an electronic device may transition from an active mode associated with a first radio access technology that uses multiple antennas to an active mode associated with a second radio access technology that uses a single antenna in accordance with an embodiment of the present invention.

FIG. 11 is a timing diagram showing the operation of device 10 when transitioning from an LTE active mode to an LTE idle mode and transitioning from a 1X idle mode to 1X active mode. Initially, device 10 is operating in an LTE active and 1X idle state. LTE traffic may be handled using one antenna to transmit LTE data and two antennas (receive diversity) to receive LTE data. Periodically, device 10 may use of one of the two antennas (e.g., the antenna associated with receiver RX2) to monitor the 1X paging channel for incoming 1X pages (see, e.g., the 1X wake interval starting at time TT in the FIG. 11 example). Several transmission time intervals before time TT, device 10 may send a rank indicator of 1 (or other channel quality indicator) to the network to direct the network to reduce the transmission of data (i.e., to transmit data using only one LTE data stream), thereby minimizing disruption to LTE operations during the temporary use of the RX2 receiver and associated antenna to monitor 1X pages.

When device 10 receives an incoming 1X page, device 10 may transition to 1X active mode, as shown in FIG. 11. Because signal quality is sufficient (in this example), only a single antenna need be used for handling 1X data reception activities. Accordingly, the remaining antenna can be used to handle LTE idle mode operations (monitoring the LTE paging channel for incoming pages).

As shown in the fourth row of the table of FIG. 6, LTE operations will be interrupted when operating in a 1X active mode in environments in which the signal strength is insufficient to support operation with only a single antenna. When operating in a 1X receive diversity (two antenna) active mode, switching circuitry 120 may be configured so that port P6 is coupled to port P5 (so that received antenna signals from a first of the two antennas are routed to path 1X RX1), switching circuitry 124 may be configured so that port P9 is coupled to port P8 (so that received antenna signals from a second of the two antennas are routed to path 1X RX2), and switching circuitry 144 may be configured so that port P2 is coupled to port P3 (i.e., so that receivers 61 and 65 operate at the same frequency). Transmitted 1X signals may be handled using path 1X TX. The use of both antennas to support 1X data reception active mode operations and the use of one of the antennas to support 1X data transmission operations will interrupt LTE operations regardless of whether it is desired to operate in an LTE idle mode (the left-hand side of the fourth row of the FIG. 6 table) or in LTE active mode (the right-hand side of the fourth row of the FIG. 6 table).

Figure 12:
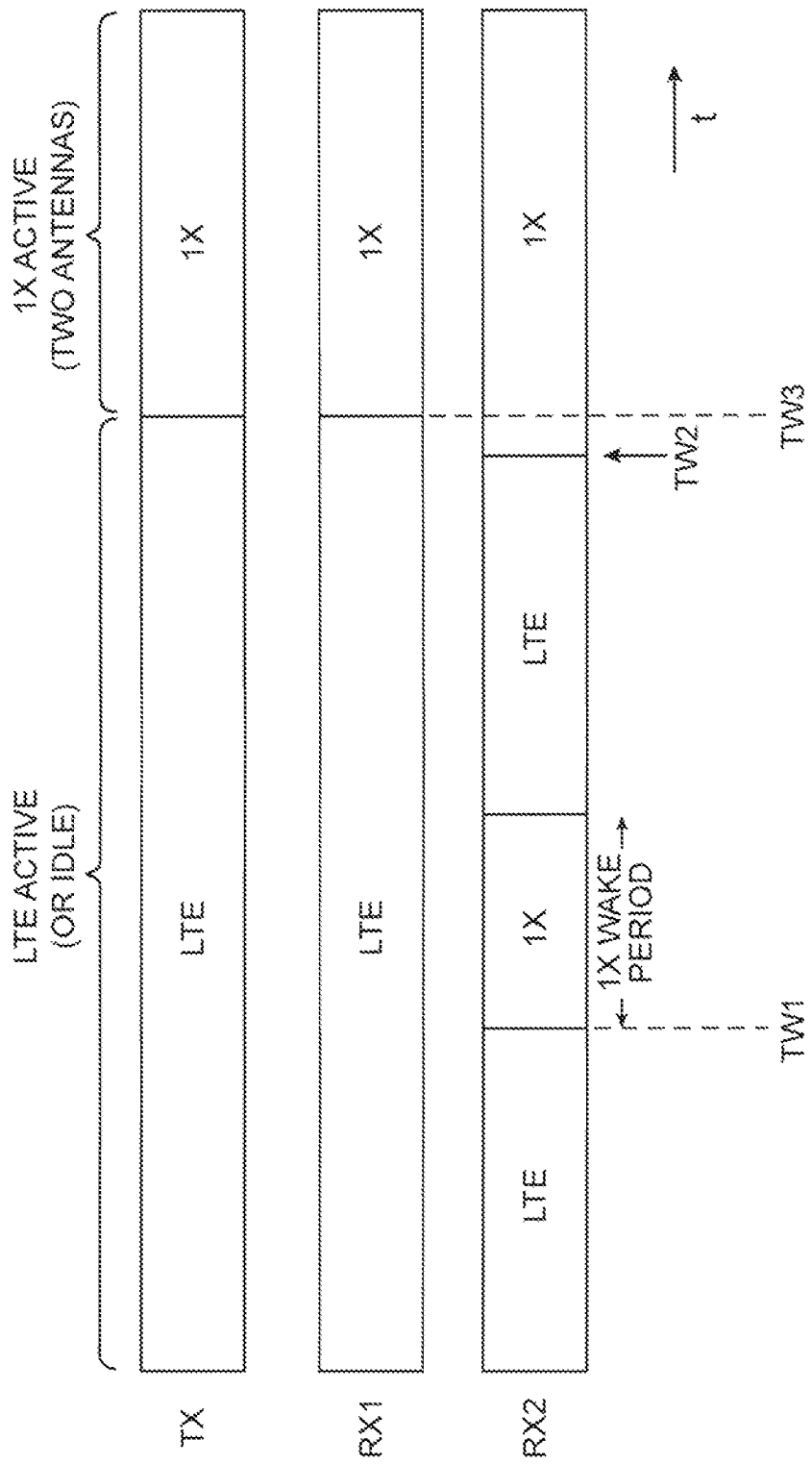
FIG. 12 is a timing diagram showing how an electronic device may transition from an active mode associated with a first radio access technology to an active mode associated with a second radio access technology that uses two antennas in accordance with an embodiment of the present invention.

FIG. 12 is a timing diagram illustrating how the use of both antennas in device to support 1X active mode operations may interrupt LTE activity. Initially, (e.g., at times before time TW1), both antennas may be used for LTE operations (e.g., LTE active mode operations or LTE idle mode operations). Periodically (e.g., at times such as time TW1 and time TW2 in the FIG. 12 example), one of the antennas (e.g., the antenna coupled to receiver RX2) may be used to monitor the 1X paging channel.

To minimize disruption to LTE operations, device may send a rank indicator of 1 or other such channel quality indicator to the network several transmission time intervals before switching use of one of the antennas from LTE activities to 1X page monitoring (i.e., several transmission time intervals before 1X page monitoring times such as times TW1 and TW2). In response, the network can reduce LTE data transmissions (e.g., by reducing transmissions from two active LTE data streams to one LTE data stream or taking other suitable action), thereby minimizing disruption to LTE operations.

In the FIG. 12 example, an incoming 1X page is detected at time TW3. As a result, device 10 enters 1X active mode at time TW3 and uses both antennas (i.e., the antenna coupled to receiver RX1 and the antenna coupled to receiver RX2) in handling a 1X call. Both antennas are being used to handle 1X activities, so LTE operations (active mode or idle mode) are interrupted.

The foregoing is merely illustrative of the principles of this invention and various modifications can be made by those skilled in the art without departing from the scope and spirit of the invention.

What is claimed is:

1. A method for communicating with a wireless network using an electronic device that supports wireless communication using a first radio access technology and a second radio access technology, comprising:
   during operation of the electronic device, simultaneously using first and second antennas in the electronic device to monitor a paging channel associated with the first radio access technology; and
   during at least a portion of the operation of the electronic device, at least partially interrupting the monitoring of the paging channel associated with the first radio access technology to monitor a paging channel associated with the second radio access technology using the first antenna alone from among the first and second antennas;
   wherein the electronic device comprises radio-frequency transceiver circuitry and control circuitry that controls the radio-frequency transceiver circuitry and wherein the radio-frequency transceiver circuitry includes first and second receivers with respective first and second local oscillators, the method further comprising:
   adjusting the radio-frequency transceiver circuitry so that the first and second local oscillators produce outputs at a common frequency when simultaneously using first and second antennas in the electronic device to monitor the paging channel associated with the first radio access technology; and
   adjusting the radio-frequency transceiver circuitry so that the first and second local oscillators produce outputs at different frequencies when monitoring the paging channel associated with the second radio access technology using the first antenna alone from among the first and second antennas.

2. The method defined in claim 1, further comprising:
   during at least another portion of the operation of the electronic device, interrupting the monitoring of the paging channel associated with the first radio access technology to monitor the paging channel associated with the second radio access technology using both the first and second antennas.

3. The method defined in claim 2, wherein the first radio access technology comprises a Long Term Evolution radio access technology and wherein the second radio access technology comprises a Code Division Multiple Access radio access technology.

4. The method defined in claim 3, further comprising:
   measuring wireless channel quality using the electronic device;
   comparing the measured wireless channel quality to a predetermined value, wherein at least partially interrupting the monitoring of the paging channel associated with the first radio access technology to monitor the paging channel associated with the second radio access technology using the first antenna alone from among the first and second antennas comprises at least partially interrupting the monitoring of the paging channel associated with the first radio access technology in response to determining that the wireless channel quality exceeds the predetermined value; and
   in response to determining that the wireless channel quality does not exceed the predetermined value, using both the first and second antennas to monitor the paging channel associated with the second radio access technology.

5. The method defined in claim 4, wherein measuring the wireless channel quality comprises gathering received signal strength indicator information associated with a wireless channel in the wireless network.

6. The method defined in claim 1, further comprising:
   while the radio-frequency transceiver circuitry is adjusted so that the first and second local oscillators produce outputs at different frequencies, using the first receiver to monitor paging signals associated with the first radio access technology while simultaneously using the second receiver to monitor paging signals associated with the second radio access technology.

7. A non-transitory computer-readable medium having instructions stored thereon that are executable by an electronic device to:
   during operation of the electronic device, simultaneously use first and second antennas in the electronic device to monitor a paging channel associated with a first radio access technology; and
   during at least a portion of the operation of the electronic device, at least partially interrupt the monitoring of the paging channel associated with the first radio access technology to monitor a paging channel associated with a second radio access technology using the first antenna alone from among the first and second antennas;
   adjust a radio-frequency transceiver circuitry of the electronic device so that first and second local oscillators produce outputs at a common frequency when simultaneously using first and second antennas in the electronic device to monitor the paging channel associated with the first radio access technology; and
   adjust the radio-frequency transceiver circuitry so that the first and second local oscillators produce outputs at different frequencies when monitoring the paging channel associated with the second radio access technology using the first antenna alone from among the first and second antennas.

8. The non-transitory computer-readable medium of claim 7, wherein the at least one computer program is further configured to cause the electronic device to:
   during at least another portion of the operation of the electronic device, interrupt the monitoring of the paging channel associated with the first radio access technology to monitor the paging channel associated with the second radio access technology using both the first and second antennas.

9. The non-transitory computer-readable medium of claim 8, wherein the at least one computer program is further configured to cause the electronic device to:
  measure wireless channel quality using the electronic device;
  compare the measured wireless channel quality to a predetermined value, wherein at least partially interrupting the monitoring of the paging channel associated with the first radio access technology to monitor the paging channel associated with the second radio access technology using the first antenna alone from among the first and second antennas comprises at least partially interrupting the monitoring of the paging channel associated with the first radio access technology in response to determining that the wireless channel quality exceeds the predetermined value; and
  in response to determining that the wireless channel quality does not exceed the predetermined value, use both the first and second antennas to monitor the paging channel associated with the second radio access technology.

10. The non-transitory computer-readable medium of claim 9, wherein measuring the wireless channel quality comprises gathering received signal strength indicator information associated with a wireless channel in a wireless network.

11. The non-transitory computer-readable medium of claim 9, wherein the at least one computer program is further configured to cause the electronic device to:
  while the radio-frequency transceiver circuitry is adjusted so that the first and second local oscillators produce outputs at different frequencies, use the first receiver to monitor paging signals associated with the first radio access technology and simultaneously use a second receiver to monitor paging signals associated with the second radio access technology.

12. An electronic device, comprising:
  at least a first and a second antenna; and
  logic configured to, during operation of the electronic device, simultaneously use first and second antennas in the electronic device to monitor a paging channel associated with a first radio access technology; and
  logic configured to, during at least a portion of the operation of the electronic device, at least partially interrupt the monitoring of the paging channel associated with the first radio access technology to monitor a paging channel associated with a second radio access technology using the first antenna alone from among the first and second antennas;
  radio-frequency transceiver circuitry and control circuitry that controls the radio-frequency transceiver circuitry and wherein the radio-frequency transceiver circuitry includes first and second receivers with respective first and second local oscillators;
  logic configured to adjust the radio-frequency transceiver circuitry so that the first and second local oscillators produce outputs at a common frequency when simultaneously using first and second antennas in the electronic device to monitor the paging channel associated with the first radio access technology; and
  logic configured to adjust the radio-frequency transceiver circuitry so that the first and second local oscillators produce outputs at different frequencies when monitoring the paging channel associated with the second radio access technology using the first antenna alone from among the first and second antennas.

13. The electronic device of claim 12, further comprising:
  logic configured to, during at least another portion of the operation of the electronic device, interrupt the monitoring of the paging channel associated with the first radio access technology to monitor the paging channel associated with the second radio access technology using both the first and second antennas.

14. The electronic device of claim 13, wherein the first radio access technology comprises a Long Term Evolution radio access technology and wherein the second radio access technology comprises a Code Division Multiple Access radio access technology.

15. The electronic device of claim 14, further comprising:
  logic configured to measure wireless channel quality using the electronic device;
  logic configured to compare the measured wireless channel quality to a predetermined value, wherein the logic configured to at least partially interrupt the monitoring of the paging channel associated with the first radio access technology to monitor the paging channel associated with the second radio access technology using the first antenna alone from among the first and second antennas comprises logic configured to at least partially interrupt the monitoring of the paging channel associated with the first radio access technology in response to determining that the wireless channel quality exceeds the predetermined value; and
  logic configured to, in response to determining that the wireless channel quality does not exceed the predetermined value, use both the first and second antennas to monitor the paging channel associated with the second radio access technology.

16. The electronic device of claim 15, wherein the logic configured to measure the wireless channel quality comprises logic configured to gather received signal strength indicator information associated with a wireless channel in a wireless network.

17. The electronic device of claim 12, wherein:
  logic configured to, while the radio-frequency transceiver circuitry is configured to be adjusted so that the first and second local oscillators produce outputs at different frequencies, use the first receiver to monitor paging signals associated with the first radio access technology, and simultaneously use the second receiver to monitor paging signals associated with the second radio access technology.

* * * * *